United States Patent
Sasaki et al.

(10) Patent No.: US 9,522,385 B2
(45) Date of Patent: Dec. 20, 2016

(54) EXHAUST GAS PURIFYING CATALYST (71) Applicants: CATALER CORPORATION, Kakegawa-shi, Shizuoka (JP); TOYOTA JIDOSHA KABUSHIKI KAISHA, Toyota-shi, Aichi (JP)

(72) Inventors: Yasuyoshi Sasaki, Shizuoka (JP); Makoto Tsuji, Shizuoka (JP); Hiroto Imai, Shizuoka (JP); Keisuke Kishita, Aichi (JP); Daisuke Ochiai, Shizuoka (JP)

(73) Assignees: Cataler Corporation, Kakegawa-shi, Shizuoka (JP); Toyota Jidosha Kabushiki Kaisha, Toyota-shi, Aichi (JP)

( * ) Notice: Subject to any disclaimer, the term of this patent is extended or adjusted under 35 U.S.C. 154(b) by 0 days.

(21) Appl. No.: 14/785,028

(22) PCT Filed: Apr. 15, 2014

(86) PCT No.: PCT/JP2014/060691
§ 371 (c)(1),
(2) Date: Oct. 16, 2015

(87) PCT Pub. No.: WO2014/171443
PCT Pub. Date: Oct. 23, 2014

(65) Prior Publication Data
US 2016/0074836 A1    Mar. 17, 2016

(30) Foreign Application Priority Data

Apr. 19, 2013 (JP) .................. 2013-088405

(51) Int. Cl.
*B01J 23/42* (2006.01)
*B01J 23/44* (2006.01)
(Continued)

(52) U.S. Cl.
CPC .............. *B01J 23/58* (2013.01); *B01D 53/945* (2013.01); *B01J 35/04* (2013.01); *B01J 37/0244* (2013.01);
(Continued)

(58) Field of Classification Search
CPC ......... B01J 23/58; B01J 35/04; B01J 37/0248; B01J 37/0244; B01D 53/945; B01D 2255/1021; B01D 2255/91; B01D 2255/1025; B01D 2258/014; B01D 2255/1023; Y02T 10/22; F01N 3/2803
(Continued)

(56) References Cited

U.S. PATENT DOCUMENTS 5,128,306 A    7/1992  Dettling et al.
6,461,579 B1 *  10/2002  Hachisuka ......... B01D 53/8628
                                              423/213.5
(Continued)

FOREIGN PATENT DOCUMENTS

EP    1 864 713 B1    11/2013
JP    2-293048        12/1990
(Continued)

OTHER PUBLICATIONS

Machine Translation of JP2003245551 (A)—Sep. 2, 2003.*

*Primary Examiner* — Anthony J Zimmer
*Assistant Examiner* — Haytham Soliman
(74) *Attorney, Agent, or Firm* — Finnegan, Henderson, Farabow, Garrett & Dunner, LLP (57) ABSTRACT

The object of the present invention is to provide a novel exhaust gas purifying catalyst having excellent NOx purification performance. The object can be achieved by an exhaust gas purifying catalyst comprising: a substrate; and a catalyst layer disposed on the substrate which comprises a first carrier, and platinum and a first palladium supported on the first carrier; in which the weight ratio of the platinum to the first palladium is 3:1 to 8:1.

4 Claims, 8 Drawing Sheets

(51) Int. Cl.
  *B01J 23/58* (2006.01)
  *B01D 53/94* (2006.01)
  *B01J 37/02* (2006.01)
  *B01J 35/04* (2006.01)
  *F01N 3/28* (2006.01)

(52) U.S. Cl.
  CPC .... *B01J 37/0248* (2013.01); *B01D 2255/1021* (2013.01); *B01D 2255/1023* (2013.01); *B01D 2255/1025* (2013.01); *B01D 2255/91* (2013.01); *B01D 2258/014* (2013.01); *F01N 3/2803* (2013.01); *Y02T 10/22* (2013.01)

(58) Field of Classification Search
  USPC ........................................................ 502/339
  See application file for complete search history.

(56)      References Cited

U.S. PATENT DOCUMENTS

| | | |
|---|---|---|
| 2004/0254069 A1 | 12/2004 | Ito |
| 2008/0124264 A1 | 5/2008 | Ikeda et al. |
| 2009/0107122 A1* | 4/2009 | Ikeda .................. F01N 13/0097 60/286 |
| 2011/0287928 A1 | 11/2011 | Nakatsuji et al. |
| 2012/0213674 A1 | 8/2012 | Schuetze et al. |

FOREIGN PATENT DOCUMENTS

| | | |
|---|---|---|
| JP | 6-39292 | 2/1994 |
| JP | 2000-300962 | 10/2000 |
| JP | 2000-314311 | 11/2000 |
| JP | 2003-245551 | 9/2003 |
| JP | 2005-21880 | 1/2005 |
| JP | 2006-281127 | 10/2006 |
| JP | 2007-530271 | 11/2007 |
| JP | 2008-155204 | 7/2008 |
| JP | 2009-285604 | 12/2009 |
| JP | 2010-58110 | 3/2010 |
| JP | 2010-201284 | 9/2010 |
| JP | 2013-510702 | 3/2013 |
| WO | WO 2005/092481 A1 | 10/2005 |
| WO | WO 2007/114082 A1 | 10/2007 |
| WO | WO 2009/144568 A1 | 12/2009 |
| WO | WO 2012/029050 A1 | 3/2012 |

* cited by examiner

EXHAUST GAS PURIFYING CATALYST

CROSS-REFERENCE TO RELATED APPLICATIONS

This application is a national phase application of International Application No. PCT/JP2014/060691, filed Apr. 15, 2014, and claims the priority of Japanese Application No. 2013-088405, filed Apr. 19, 2013, the content of both of which is incorporated herein by reference.

TECHNICAL FIELD

The present invention relates to an exhaust gas purifying catalyst.

BACKGROUND ART

Exhaust gas discharged from internal combustion engines such as vehicle engines contains hazardous substances such as hydrocarbon (HC), carbon monoxide (CO), and nitric oxide (NOx). Since these substances cause air pollution, purification of exhaust gas is necessary.

Exhaust gas can be purified using exhaust gas purifying catalysts. In general, exhaust gas purifying catalysts are composed of a substrate and a catalyst layer disposed on the substrate. Such catalyst layer comprises a carrier and a catalyst metal supported on the carrier. Noble metals such as platinum, palladium, and rhodium are commonly used as catalyst metals.

For example, Patent Document 1 discloses an exhaust gas purifying catalyst for NOx purification. The catalyst comprises: a substrate; and a lower catalyst layer and an upper catalyst layer disposed on the substrate, wherein the lower catalyst layer comprises rhodium, and the upper catalyst layer comprises rhodium and at least one of platinum and palladium.

In addition, Patent Document 2 also discloses an exhaust gas purifying catalyst for NOx purification. The catalyst comprises: a substrate; and a lower catalyst layer and an upper catalyst layer disposed on the substrate, wherein the lower catalyst layer comprises rhodium, and the upper catalyst layer comprises platinum and palladium.

PRIOR ART DOCUMENTS

Patent Documents

Patent Document 1: JP Patent Publication (Kokai) No. 2009-285604 A

Patent Document 2: JP Patent Publication (Kokai) No. 2010-201284 A

SUMMARY OF THE INVENTION

Problem to Be Solved by the Invention

As disclosed in Patent Documents 1 and 2, there are many known exhaust gas purifying catalysts for NOx purification. Nevertheless, the improvement of further NOx purification performance is still in demand.

Therefore, the object of the present invention is to provide a novel exhaust gas purifying catalyst having excellent NOx purification performance.

Means for Solving the Problems

After the long-term use of platinum for purification of exhaust gas, sintering of platinum takes place, which results in an increase in platinum particle size. As a result, the catalyst activity of platinum decreases, which causes a decline in NOx purification performance. As a result of diligent studies, the present inventors found that the sintering of platinum can be significantly reduced by allowing platinum and palladium to be supported together on the same carrier at a certain ratio. Accordingly, decrease in catalyst activity of platinum can be prevented, and thereby excellent NOx purification performance can be achieved.

Specifically, the present invention encompasses the following.

[1] An exhaust gas purifying catalyst comprising:
    a substrate; and
    a catalyst layer disposed on the substrate, which comprises a first carrier, and platinum and a first palladium supported on the first carrier; wherein
    the weight ratio of the platinum to the first palladium is 3:1 to 8:1

[2] The exhaust gas purifying catalyst according to [1], wherein the weight ratio of the platinum supported on the first carrier in relation to the first carrier is 0.04 or less.

[3] The exhaust gas purifying catalyst according to [1] or [2], wherein the catalyst layer further comprises a second carrier and a second palladium supported on the second carrier while platinum is not supported on the second carrier.

This description includes all of the contents as disclosed in Japanese Patent Application No. 2013-088405 for which priority is claimed to the present application.

Effects of the Invention

According to the present invention, a novel exhaust gas purifying catalyst having excellent NOx purification performance can be provided.

EMBODIMENTS FOR CARRYING OUT THE INVENTION

The present invention is described in detail below.

The present invention relates to an exhaust gas purifying catalyst, which comprises: a substrate; and a catalyst layer disposed on the substrate comprising: a first carrier; and platinum and a first palladium supported on the first carrier, wherein the weight ratio of the platinum to the first palladium is 3:1 to 8:1.

In the exhaust gas purifying catalyst of the present invention, platinum and palladium are supported together on the same carrier at a certain ratio so that sintering of the platinum can be significantly inhibited. As a result, a decrease in catalyst activity of platinum is suppressed and thus excellent NOx purification performance is achieved.

The exhaust gas purifying catalyst of the present invention can preferentially purify NOx even in a lean atmosphere. Since, when a lean-burn engine is used, the amounts of NOx emissions are very large though the amounts of HC and CO emissions are small, NOx cannot be sufficiently purified with generally available three-way catalysts, However, with the use of the exhaust gas purifying catalyst of the present invention, NOx discharged from lean-burn engines can be efficiently purified while preventing a decrease in catalyst activity of platinum.

A substrate that is generally used for exhaust gas purifying catalysts can be used as the substrate of the exhaust gas purifying catalyst of the present invention. Examples thereof include straight-flow-type and wall-flow-type monolith substrates. The material of the substrate is not particularly limited. A substrate made of ceramic, silicon carbide, metal, or the like can be used.

The catalyst layer disposed on the substrate comprises: the first carrier; and platinum and the first palladium which are supported on the first carrier.

The weight ratio of platinum supported on the first carrier relative to the first carrier is preferably 0.04 or less, though it is not particularly limited. NOx purification performance can be further improved by supporting platinum at such weight ratio. The lower limit of the weight ratio of platinum is 0.001, 0.005, or the like, for example, though it is not particularly limited.

The amount of platinum supported on the first carrier is not particularly limited. However, from the viewpoints of efficient NOx purification and production cost, it is preferably 0.1 to 2 g, more preferably 0.5 to 1.8 g, and further preferably 0.8 to 1.6 g per 1 L of the substrate.

The catalyst layer disposed on the substrate may comprise other optional components in addition to the first carrier and the platinum and the first palladium supported on the first carrier.

The catalyst layer may further comprise a second carrier and a second palladium supported on the second carrier. It is preferable that platinum is not supported on the second carrier. In addition, the catalyst layer may further comprise rhodium, In a case in which the catalyst layer comprises rhodium, rhodium is preferably supported on another carrier that is different from the first or the second carrier. The first carrier, the second carrier, and the carrier supporting rhodium may be of the same kind, or they may be different kinds of carriers.

The weight ratio of the first palladium to the second palladium preferably ranges from 1:0.5 to 1:3, though it is not particularly limited. NOx purification performance can be further improved when the weight ratio is within such range.

The total amount of palladium contained in the catalyst layer is not particularly limited. However, from the viewpoints of efficient NOx purification and production cost, it is preferably 0.1 to 1 g, more preferably 0.2 to 0.8 g, and particularly preferably 0.4 to 0.6 per 1 L of the substrate.

The amount of rhodium contained in the catalyst layer is not particularly limited. However, from the viewpoints of efficient NOx purification and production cost, it is preferably 0.1 to 2 g, more preferably 0.1 to 1.5 g, and particularly preferably 0.1 to 1.2 g per 1 L of the substrate.

Examples of carriers include zirconia, alumina, titanic, silica, cerin, and magnesia. In addition, a composite oxide comprising cerium and at least one member selected from the group consisting of zirconium, hafnium, neodymium, yttrium, lanthanum, praseodymium, and nickel can also be used as a carrier. One type of carrier may be used alone or two or more different types of carriers may be used in combination.

The catalyst layer may further comprise a substance that functions to store NOx (hereafter referred to as an "NOx storage substance(s)"). Examples of NOx storage substance include alkali metals, alkaline-earth metals, and rare-earth elements. Examples of alkali metals include lithium, sodium, potassium, rubidium, cesium, and francium. Examples of alkaline-earth metals include beryllium, magnesium, calcium, strontium, barium, and radium. Examples of rare-earth elements include scandium, yttrium, lanthanum, cerium, praseodymium, neodymium, promethium, samarium, europium, gadolinium, terbium, dysprosium, holmium, erbium, thulium, ytterbium, and lutetium. The NOx storage substance may be supported on a carrier or it may be present in a catalyst layer without being supported on a carrier. One type of NOx storage substance may be used alone or two or more different types of NOx storage substances may be used in combination.

The amount of the NOx storage substance is not particularly limited. However, from the viewpoint of efficient NOx purification, it is preferably 0.01 to 5 mol, more preferably 0.05 to 1 mol, and particularly preferably 0.1 to 0.5 mol per 1 L of the substrate.

The weight ratio of platinum to the first palladium supported on the first carrier is 3:1 to 8:1 as described above. With the use of platinum and the first palladium supported on the first carrier at such weight ratio, NOx oxidation performance can be improved, thereby allowing efficient $NO_2$ generation. In a lean atmosphere, oxygen is excessively present, which makes it difficult to purify (reduce) NOx. However, NOx emission can be reduced by oxidizing NOx to $NO_2$ in a lean atmosphere and allowing an NOx storage substance to store $NO_2$. In addition, when the lean atmosphere changes to a rich atmosphere, the NOx storage substance is induced to discharge $NO_2$ so as to allow $NO_2$ to react with a reductant (e.g., HC or CO), thereby allowing purification of NOx to $N_2$. That is, NOx purification performance can be improved by improving NOx oxidation performance.

The exhaust gas purifying catalyst of the present invention is mainly composed of a substrate and a catalyst layer. It may comprise an optional layer unless the effects of the present invention are impaired. For example, an optional layer may be provided between a substrate and a catalyst layer.

Figure 1:
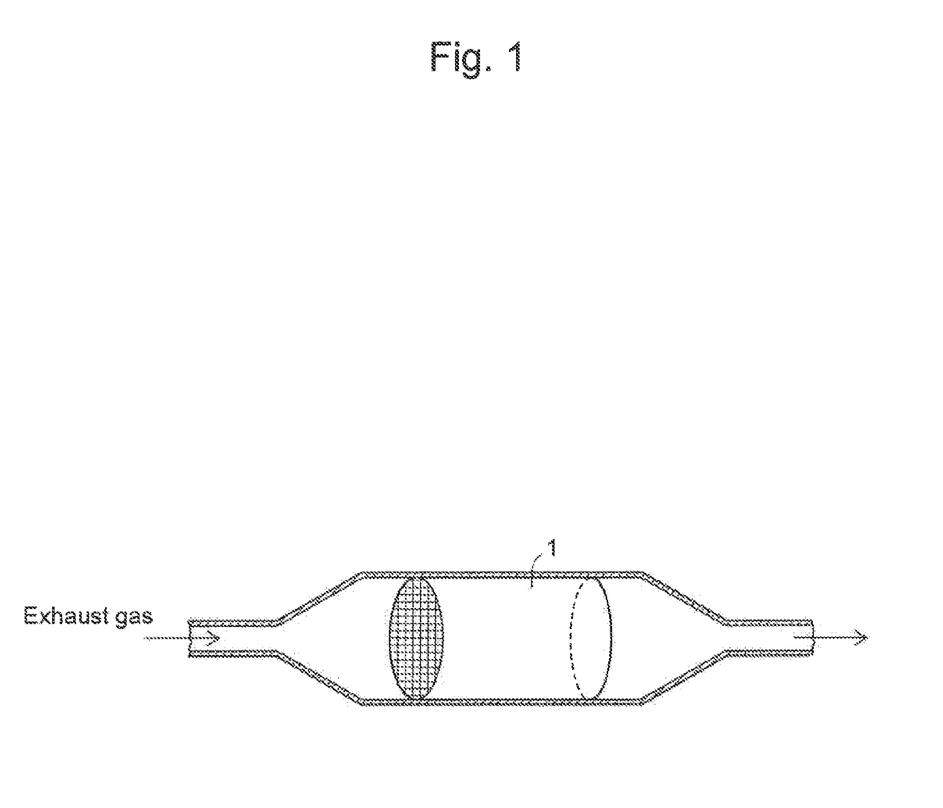
FIG. 1 shows an example of an exhaust gas purifying catalyst.
Figure 2:
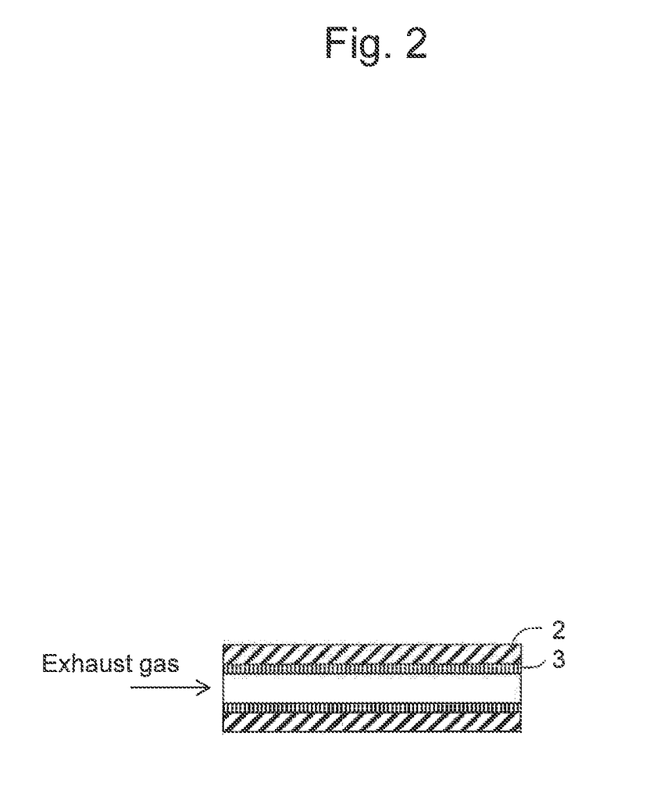
FIG. 2 shows a part of a cross-sectional view of an exhaust gas purifying catalyst.
Figure 3:
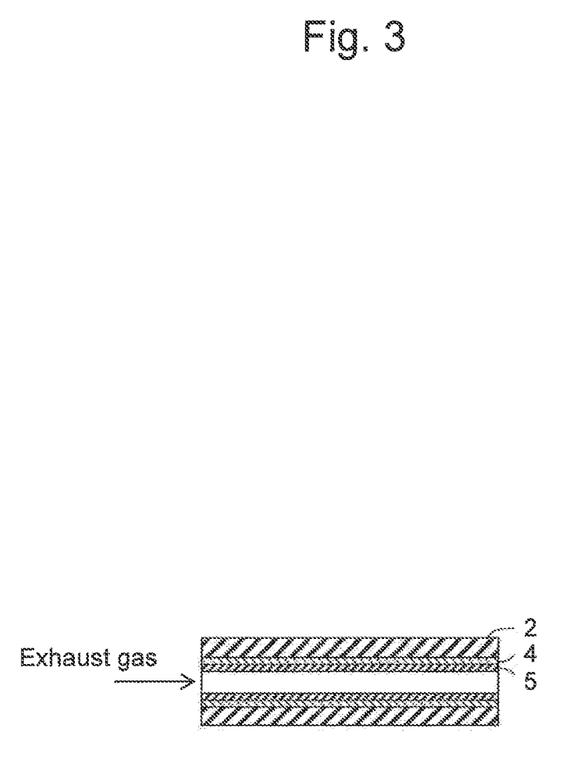
FIG. 3 shows a part of a cross-sectional view of an exhaust gas purifying catalyst.
Figure 4:
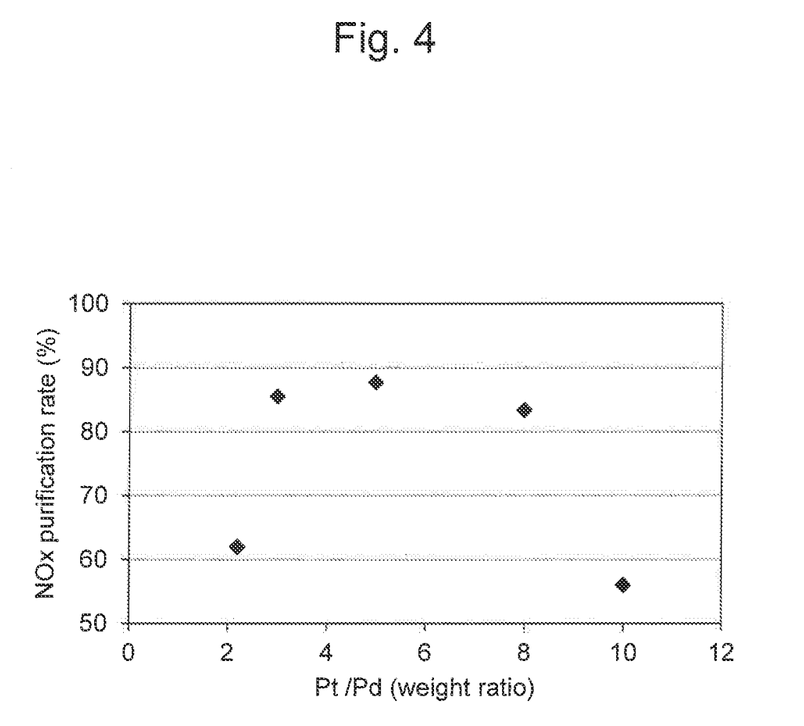
FIG. 4 shows the relationship between the weight ratio of platinum to the first palladium on the first carrier and the NOx purification rate.
Figure 5:
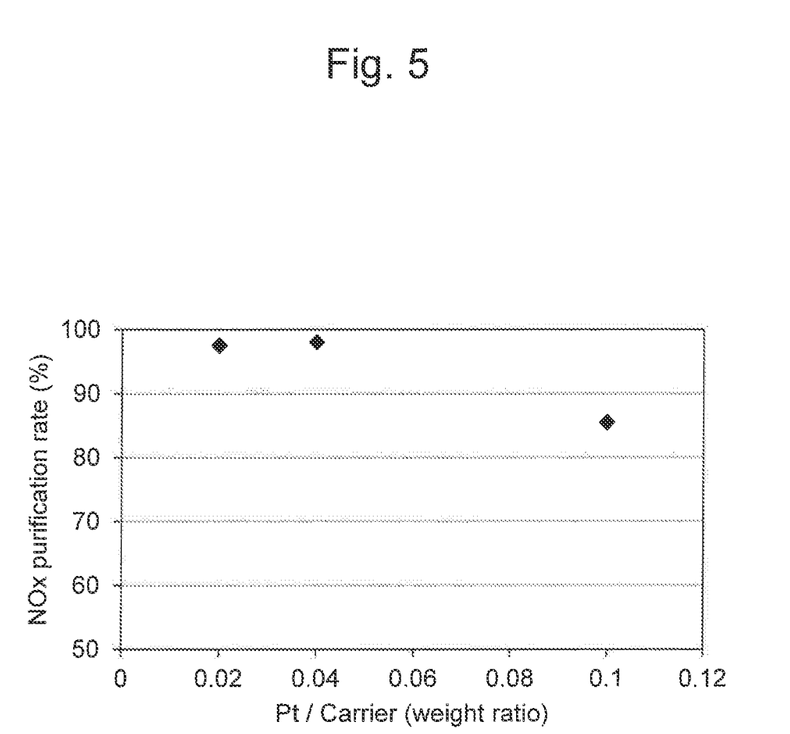
FIG. 5 shows the relationship between the weight ratio of platinum on the first carrier to the first carrier and the NOx purification rate.
Figure 6:
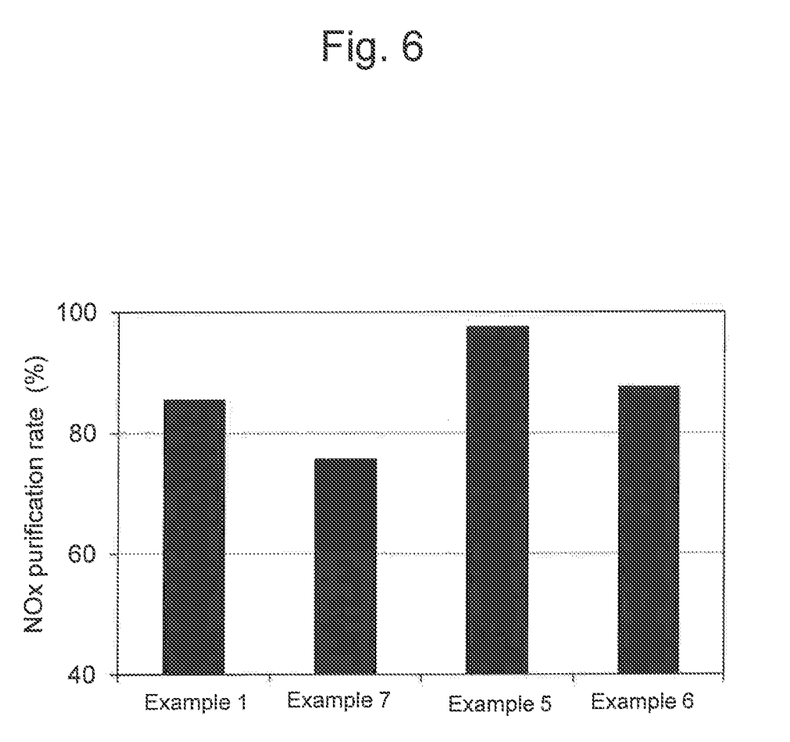
FIG. 6 shows the relationship between the presence or absence of the second palladium and the NOx purification rate.
Figure 7:
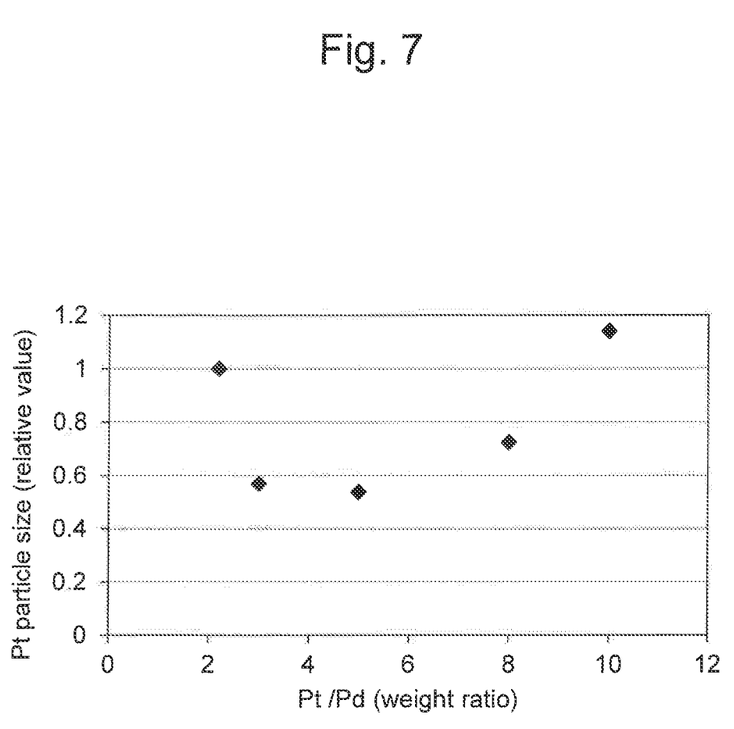
FIG. 7 shows the relationship between the weight ratio of platinum to the first palladium on the first carrier and the particle size of platinum.
Figure 8:
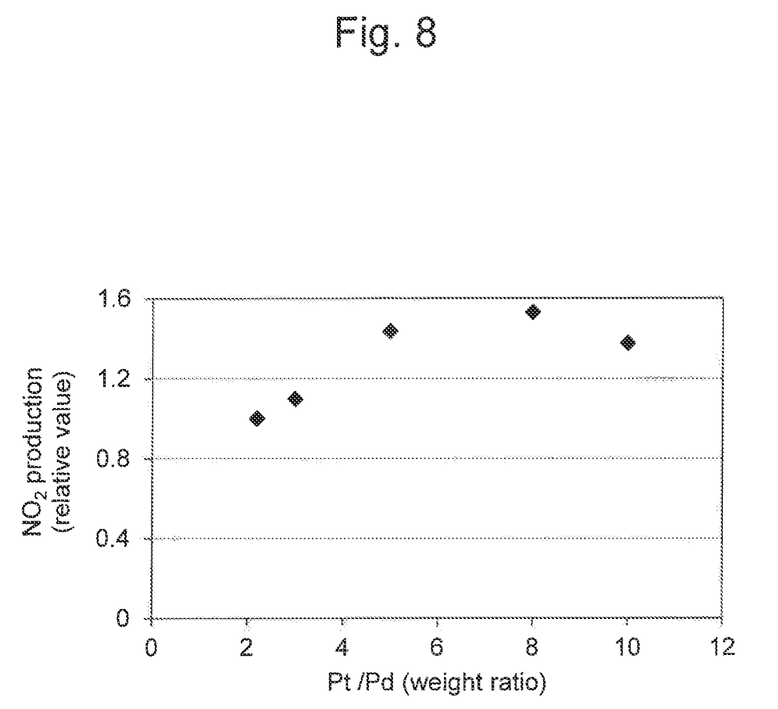
FIG. 8 shows the relationship between the weight ratio of platinum to the first palladium on the first carrier and the production of $NO_2$.

The catalyst layer may consist of a single catalyst layer (FIG. 2) or a combination of a plurality of catalyst layers. The catalyst layer preferably comprises, but is not limited thereto, a lower catalyst layer disposed on a substrate and an upper catalyst layer disposed on the lower catalyst layer (FIG. 3).

Here, if the catalyst layer comprises rhodium, it is preferable that rhodium be present in a catalyst layer other than the catalyst layer in which platinum and the first palladium are present. It is particularly preferable that rhodium be present in the lower catalyst layer while platinum and the first palladium are present in the upper catalyst layer.

If the catalyst layer comprises the second palladium, it is preferable that the second palladium be present in the same catalyst layer in which platinum and the first palladium are present. It is particularly preferable that the second palladium, platinum, and the first palladium be present in the upper catalyst layer.

If the catalyst layer comprises an NOx storage substance, it is preferable that the NOx storage substance be present in both the upper and lower catalyst layers.

In one embodiment of the present invention, the following is provided: an exhaust gas purifying catalyst, which comprises:
 a substrate;
 a lower catalyst layer disposed on the substrate comprising a carrier, rhodium supported on the carrier, and an NOx storage substance; and
 an upper catalyst layer disposed on the lower catalyst layer comprising a first carrier, platinum and a first palladium supported on the first carrier, and an NOx storage substance, wherein
 the weight ratio of the platinum to the first palladium is 3:1 to 8:1.

In another embodiment of the present invention, the following is provided: an exhaust gas purifying catalyst, which comprises:
 a substrate;
 a lower catalyst layer disposed on the substrate comprising a carrier, rhodium supported on the carrier, and an NOx storage substance; and
 an upper catalyst layer disposed on the lower catalyst layer comprising a first carrier, platinum and a first palladium supported on the first carrier, a second carrier, a second palladium supported on the second carrier, and an NOx storage substance, wherein
 the weight ratio of the platinum to the first palladium is 3:1 to 8:1, and platinum is not supported on the second carrier.

EXAMPLES

The present invention is explained with reference to the Examples and Comparative Examples below; however, the technical scope of the present invention is not limited thereto.

<Production of an Exhaust Gas Purifying Catalyst>

Example 1

(1) Zirconia (30 g) was suspended in water and then rhodium nitrate was added thereto. The mixture was evaporated to dryness to obtain a rhodium-supporting powder. The amount of rhodium supported was 1% by weight in relation to zirconia.

The obtained rhodium-supporting powder, alumina (140 g), and water were mixed to obtain a coating material [1-1].

(2) Alumina (10 g) (first carrier) was suspended in water and then platinum nitrate and palladium nitrate (first palladium) were added thereto at a weight ratio of 3:1 (Pt:Pd). The mixture was evaporated to dryness to obtain a platinum-palladium supporting powder. The amounts of platinum and palladium supported were 10% by weight and 3.3% by weight, respectively, in relation to alumina.

Alumina (5 g) (second carrier) was suspended in water and then palladium nitrate (second palladium) was added. The mixture was evaporated to dryness to obtain a palladium supporting powder. The amount of palladium supported was 3.4% by weight in relation to alumina.

The platinum-palladium supporting powder and palladium supporting powder obtained above, alumina (65 g), and water were mixed to obtain a coating material [1-2].

(3) A monolith substrate (1 L) was coated with the coating material [1-1] and sintered so that a lower catalyst layer was formed. The lower catalyst layer was coated with the coating material [1-2] and sintered so that an upper catalyst layer was formed. The lower catalyst layer and the upper catalyst layer were allowed to contain barium and potassium. The contents of barium and potassium per 1 L of the monolith substrate were both 0.1 mol.

Example 2

(1) Alumina (10 g) was suspended in water and then platinum nitrate and palladium nitrate were added thereto at a ratio of 5:1 (Pt:Pd). The mixture was evaporated to dryness to obtain a platinum-palladium supporting powder. The amounts of platinum and palladium supported were 10% by weight and 2% by weight, respectively, in relation to alumina.

Alumina (5 g) was suspended in water and then palladium nitrate was added. The mixture was evaporated to dryness to obtain a palladium supporting powder. The amount of palladium supported was 6% by weight in relation to alumina.

The platinum-palladium supporting powder and palladium supporting powder obtained, alumina (65 g), and water were mixed to obtain a coating material [2-2].

(2) An exhaust gas purifying catalyst was produced in the manner described in Example 1 except that the coating material [2-2] was used instead of the coating material [1-2] of Example 1.

Example 3

(1) Alumina (10 g) was suspended in water and then platinum nitrate and palladium nitrate were added thereto at a ratio of 8:1 (Pt:Pd). The mixture was evaporated to dryness to obtain a platinum-palladium supporting powder. The amounts of platinum and palladium supported were 10% by weight and 1.25% by weight, respectively, in relation to alumina.

Alumina (5 g) was suspended in water and then palladium nitrate was added. The mixture was evaporated to dryness to obtain a palladium supporting powder. The amount of palladium supported was 7.5% by weight in relation to alumina.

The platinum-palladium supporting powder and palladium supporting powder obtained above, alumina (65 g), and water were mixed to obtain a coating material [3-2].

(2) An exhaust gas purifying catalyst was produced in the manner described in Example 1 except that the coating material [3-2] was used instead of the coating material [1-2] of Example 1.

Example 4

(1) Alumina (25 g) was suspended in water and then platinum nitrate and palladium nitrate were added thereto at a ratio of 3:1 (Pt:Pd). The mixture was evaporated to dryness to obtain a platinum-palladium supporting powder. The amounts of platinum and palladium supported were 4% by weight and 1.32% by weight, respectively, in relation to alumina.

Alumina (5 g) was suspended in water and then palladium nitrate was added. The mixture was evaporated to dryness to obtain a palladium supporting powder. The amount of palladium supported was 3.4% in relation to the amount of alumina.

The platinum-palladium supporting powder and palladium supporting powder obtained above. alumina (50 g), and water were mixed to obtain a coating material [4-2].

(2) An exhaust gas purifying catalyst was produced in the manner described in Example 1 except that the coating material [4-2] was used instead of the coating material [1-2] of Example 1.

Example 5

(1) Alumina (45 g) was suspended in water and then platinum nitrate and palladium nitrate were added thereto at a ratio of 3:1 (Pt:Pd). The mixture was evaporated to dryness to obtain a platinum-palladium supporting powder. The amounts of platinum and palladium supported were 2,22% by weight and 0.73% by weight, respectively, in relation to alumina.

Alumina (5 g) was suspended in water and then palladium nitrate was added. The mixture was evaporated to dryness to obtain a palladium supporting powder. The amount of palladium supported was 3.4% by weight in relation to alumina.

The platinum-palladium supporting powder and palladium supporting powder obtained above, alumina (30 g), and water were mixed to obtain a coating material [5-2].

(2) An exhaust gas purifying catalyst was produced in the manner described in Example 1 except that the coating material [5-2] was used instead of the coating material [1-2] of Example 1.

Example 6

(1) Alumina (45 g) was suspended in water and then platinum nitrate and palladium nitrate were added thereto at a ratio of 3:1 (Pt:Pd). The mixture was evaporated to dryness to obtain a platinum-palladium supporting powder. The amounts of platinum and palladium supported were 2.22% by weight and 0.733% by weight, respectively, in relation to alumina.

The platinum-palladium supporting powder obtained above, alumina (35 g), and water were mixed to obtain a coating material [6-2].

(2) An exhaust gas purifying catalyst was produced in the manner described in Example 1 except that the coating material [6-2] was used instead of the coating material [1-2] of Example 1.

Example 7

(1) Alumina (10 g) was suspended in water and then platinum nitrate and palladium nitrate were added thereto at a ratio of 3:1 (Pt:Pd). The mixture was evaporated to dryness to obtain a platinum-palladium supporting powder. The amounts of platinum and palladium supported were 10% by weight and 3.3% by weight, respectively, in relation to alumina.

The platinum-palladium supporting powder obtained above, alumina (70 g), and water were mixed to obtain a coating material [7-2].

(2) An exhaust gas purifying catalyst was produced in the manner described in Example 1 except that the coating material [7-2] was used instead of the coating material [1-2] of Example 1.

Comparative Example 1

(1) Alumina (10 g) was suspended in water and then platinum nitrate and palladium nitrate were added thereto at a ratio of 2.2:1 (Pt:Pd). The mixture was evaporated to dryness to obtain a platinum-palladium supporting powder. The amounts of platinum and palladium supported were 10% by weight and 4.5% by weight, respectively, in relation to alumina.

Alumina (5 g) was suspended in water and then palladium nitrate was added. The mixture was evaporated to dryness, and thus a palladium supporting powder. The amount of palladium supported was 1% by weight in relation to alumina.

The platinum-palladium supporting powder and palladium supporting powder obtained above, alumina (65 g), and water were mixed to obtain a coating material [1X-2].

(2) An exhaust gas purifying catalyst was produced in the manner described in Example 1 except that the coating material [1X-2] was used instead of the coating material [1-2] of Example 1.

Comparative Example 2

(1) Alumina (10 g) was suspended in water and then platinum nitrate and palladium nitrate were added thereto at a ratio of 10:1 (Pt:Pd). The mixture was evaporated to dryness to obtain a platinum-palladium supporting powder. The amounts of platinum and palladium supported were 10% by weight and 1% by weight, respectively, in relation to alumina.

Alumina (5 g) was suspended in water and then palladium nitrate was added. The mixture was evaporated to dryness to obtain a palladium supporting powder. The amount of palladium supported was 8% by weight in relation to alumina.

The platinum-palladium supporting powder and palladium supporting powder obtained above, alumina (65 g), and water were mixed to obtain a coating material [2X-2].

(2) An exhaust gas purifying catalyst was produced in the manner described in Example 1 except that the coating material [2X-2] was used instead of the coating material [1-2] of Example 1.

Comparative Example 3

(1) Alumina (10 g) was suspended in water and then platinum nitrate was added thereto. The mixture was evaporated to dryness to obtain a platinum-supporting powder. The amount of platinum supported was 10% by weight in relation to alumina.

Alumina (5 g) was suspended in water and then palladium nitrate was added. The mixture was evaporated to dryness to obtain a palladium supporting powder. The amount of palladium supported was 10% by weight in relation to alumina.

The platinum-supporting powder and palladium supporting powder obtained above, alumina (65 g), and water were mixed to obtain a coating material [3X-2].

(2) An exhaust gas purifying catalyst was produced in the manner described in Example 1 except that the coating material [3X-2] was used instead of the coating material [1-2] of Example 1.

<Performance Evaluation Test>

(1) Each of the exhaust gas purifying catalysts produced in the Examples and the Comparative Examples was built into a converter. Each converter with built-in catalyst was installed in a 2-L engine. Durability tests were performed at a catalyst bed temperature of 750° C. and at stoichiometry for 150 hours.

(2) After the above durability tests, each converter with built-in catalyst was installed in a lean-burn gasoline engine and the NOx purification rate was determined at a cycle of 60 seconds in a lean atmosphere and 3 seconds in a rich atmosphere. In addition, the catalyst bed temperature was set to 400° C.

(3) The platinum-palladium supporting powders and platinum supporting powders produced in the Examples and Comparative Examples were subjected to durability tests at 700° C. for 10 hours. Then, the particle size of platinum supported on the first carrier was assayed by X-ray diffraction.

(4) The NOx concentration and the NO concentration were determined, and the difference therebetween was used to evaluate NO oxidation performance ($NO_2$ concentration). Table 1 and FIGS. 4-8 show the results.

TABLE 1

|  | Pt:Pd[1] (weight ratio) | Pt/[1st]Carrier[2] (weight ratio) | [1st]Pd:[2nd]Pd[3] (weight ratio) | NOx purification rate (%) | Pt particle size (relative value)[4] | $NO_2$ production (relative value)[4] |
|---|---|---|---|---|---|---|
| Example 1 | 3:1 | 0.1 | 1:0.5 | 85.5 | 0.568 | 1.098 |
| Example 2 | 5:1 | 0.1 | 1:1.5 | 87.7 | 0.538 | 1.434 |
| Example 3 | 8:1 | 0.1 | 1:3 | 83.4 | 0.724 | 1.530 |
| Example 4 | 3:1 | 0.04 | 1:0.5 | 98.0 | 0.310 | 1.052 |
| Example 5 | 3:1 | 0.02 | 1:0.5 | 97.5 | 0.352 | 1.047 |
| Example 6 | 3:1 | 0.02 | —[5] | 87.6 | 0.352 | 0.9807 |
| Example 7 | 3:1 | 0.1 | —[5] | 75.6 | 0.568 | 1.028 |
| Comparative Example 1 | 2.2:1 | 0.1 | 1:0.1 | 62.0 | 1 | 1 |
| Comparative Example 2 | 10:1 | 0.1 | 1:4 | 56.0 | 1.14 | 1.376 |
| Comparative Example 3 | —[6] | 0.1 | —[6] | 53.5 | 1.23 | 1.255 |

[1]Pt on the 1st carrier:Pd on the 1st carrier
[2]Pt on the 1st carrier relative to the 1st carrier
[3]Pd on the 1st carrier:Pd on the 2nd carrier
[4]Based on the results obtained using the catalyst of Comparative Example 1
[5]No Pd is existed on the 2nd carrier
[6]No Pd is existed on the 1st carrier

REFERENCE NUMERALS

1: Exhaust gas purifying catalyst; 2: Substrate; 3: Catalyst layer; 4: Lower catalyst layer; and 5: Upper catalyst layer All publications cited herein are incorporated herein by reference in their entirety.

The invention claimed is:

1. An exhaust gas purifying catalyst comprising:
a substrate; and
a catalyst layer disposed on the substrate, which comprises
    a first carrier, and platinum and a first palladium supported on the first carrier; and
    a second carrier, and a second palladium supported on the second carrier; wherein
the weight ratio of the platinum to the first palladium is 3:1 to 8:1,
platinum is not supported on the second carrier, and
the weight ratio of the first palladium to the second palladium is 1:0.5 to 1:3.

2. The exhaust gas purifying catalyst according to claim 1, wherein the weight ratio of the platinum supported on the first carrier in relation to the first carrier is 0.04 or less.

3. The exhaust gas purifying catalyst according to claim 1, further comprising a lower catalyst layer between the substrate and the catalyst layer, wherein the lower catalyst layer includes rhodium.

4. The exhaust gas purifying catalyst according to claim 2, further comprising a lower catalyst layer between the substrate and the catalyst layer, wherein the lower catalyst layer includes rhodium.

* * * * *